March 31, 1964  A. AGAMIAN  3,126,966
HELICOPTER
Filed May 7, 1962  5 Sheets-Sheet 1

FIG. 1

INVENTOR
ALEXANDER AGAMIAN
BY *Jack M. Wiseman*
ATTORNEY

FIG. 2

March 31, 1964     A. AGAMIAN     3,126,966
HELICOPTER Filed May 7, 1962     5 Sheets-Sheet 4

United States Patent Office 3,126,966
Patented Mar. 31, 1964

3,126,966
HELICOPTER
Alexander Agamian, San Jose, Calif.
(475 Dover Way, Apt. 16, Campbell, Calif.)
Filed May 7, 1962, Ser. No. 192,675
11 Claims. (Cl. 170—135.24)

The present invention relates in general to aircraft, and more particularly to a helicopter.

An object of the present invention is to provide a helicopter with an improved transmission for driving oppositely rotating rotors.

Another object of the present invention is to provide a helicopter with a transmission for driving oppositely rotating rotors which is economical to manufacture without sacrificing safety in performance.

Another object of the present invention is to provide a helicopter with a transmission for driving oppositely rotating rotors that can be manufactured with facility without sacrificing durability.

Another object of the present invention is to provide a helicopter with improved flight control.

Another object of the present invention is to provide a helicopter with simplified flight controls without sacrificing durability or safety.

Another object of the present invention is to provide a helicopter wherein the rotor system engages and disengages the engine drive with facility and ease of operation.

Another object of the present invention is to provide a helicopter wherein the engine transmission is automatically disengaged from the rotor system in the event of engine failure.

Another object of the present invention is to provide a helicopter with an auxiliary reaction engine for increasing the forward thrust.

Another object of the present invention is to provide a helicopter with an auxiliary reaction engine for increasing the forward thrust wherein the main drive engine exhaust gas is consumed by the reaction engine to produce the forward thrust.

Another object of the present invention is to provide a helicopter with rotors driven by a main engine and with an auxiliary reaction engine for increasing the forward thrust, which auxiliary engine ignites a mixture of the main engine exhaust gas, air and fuel.

Other and further objects and advantages of the present invention will be apparent to one skilled in the art from the following description taken in conjunction with the accompanying drawings, in which:

Figure 1:
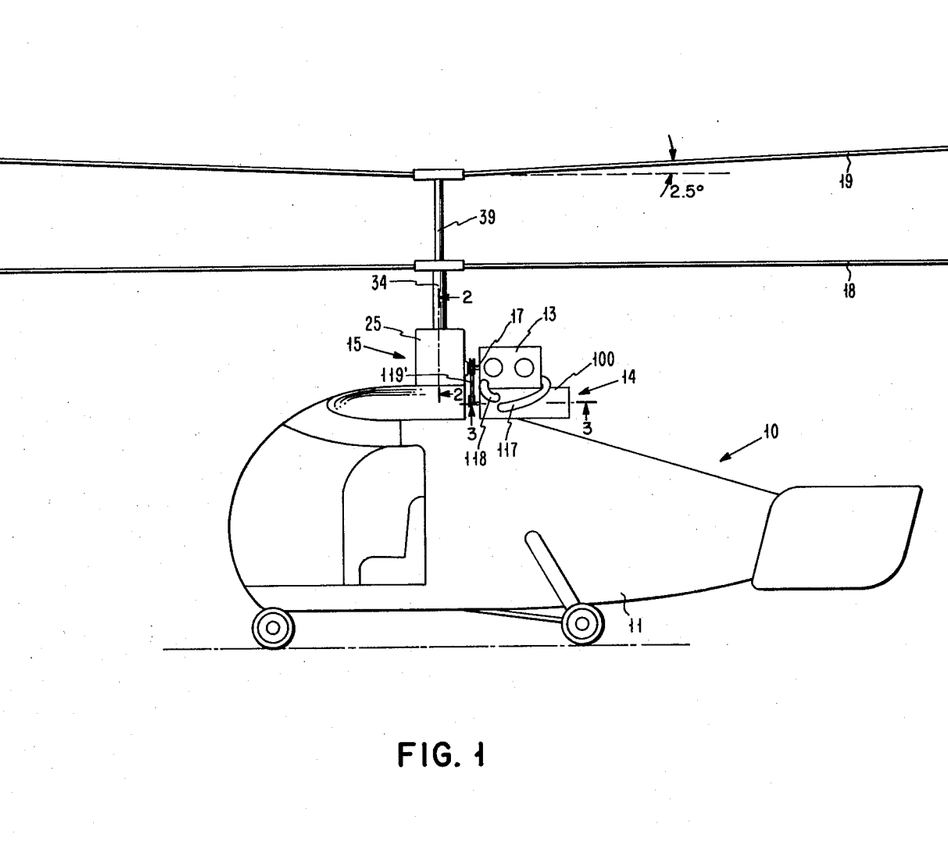
FIG. 1 is a side elevational view of a helicopter embodying the present invention.

Illustrated in FIG. 1 is a helicopter 10 comprising a conventional fuselage 11. Supported by the fuselage 11 in a suitable manner is a conventional main engine 13.

Below the engine 13 and carried by the fuselage 11 is an auxiliary reaction engine 14 of the present invention, which serves to increase the forward thrust of the helicopter 10.

The engine 13 is coupled to a double differential transmission 15 of the present invention through a drive shaft 17. Operation of the transmission 15 drives in opposite directions of rotation a conventional lower rotor 18 and a conventional upper rotor 19. The rotation of the rotors 18 and 19 controls the lifting, lowering and direction of flight of the helicopter 10. When the rotors 18 and 19 rotate at the same r.p.m. and in opposite directions, the helicopter 10 continues in flight at a relatively straight course. By varying the relative r.p.m. between the rotors 18 and 19, the direction of flight of the helicopter 10 is controlled and altered.

Figure 2:
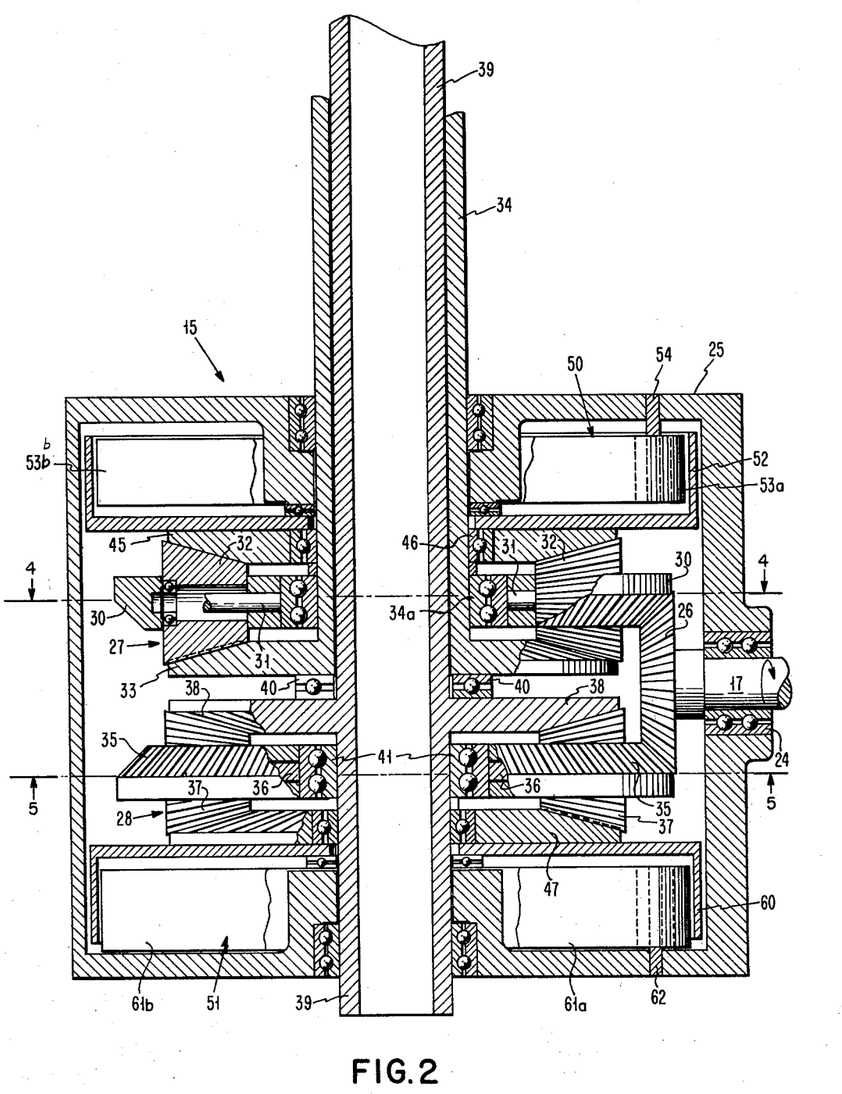
FIG. 2 is an enlarged vertical sectional view taken along line 2—2 of FIG. 1 to illustrate the double differential transmission system for the rotors.

As shown in FIGS. 1 and 2, the differential transmission 15 includes a substantially cylindrical stationary housing 25. The housing 25 is secured to the fuselage 11 in any suitable manner. Received by the housing 25 is the horizontally disposed main engine drive shaft 17. Suitable bearings 24 (FIG. 2) are provided between the housing 25 and the drive shaft 17. Fixed to the distal end of the shaft 17 for rotation therewith is a vertically disposed bevel gear 26 (FIGS. 2–5).

Centrally disposed within the cylindrical housing are vertically spaced, coaxial differential gear systems 27 and 28. The upper differential gear system 27 and the lower differential gear system 28 are in continuous meshing engagement with the vertical bevel gear 26.

Figure 4:
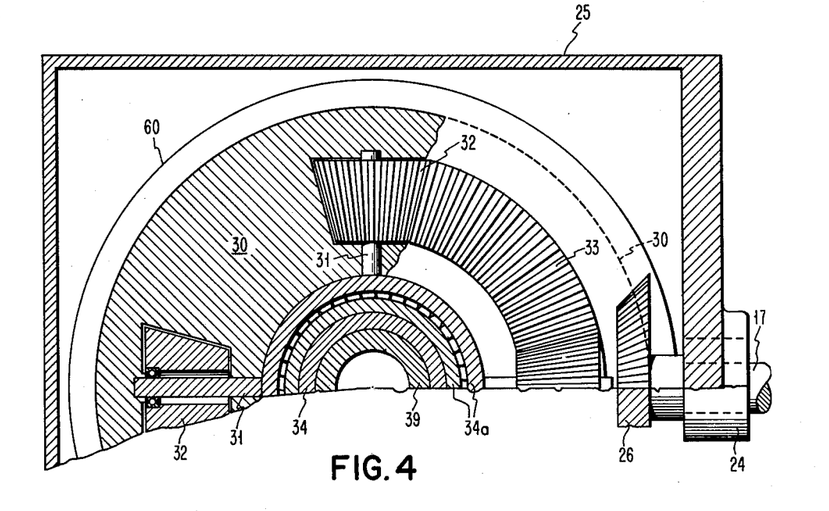
FIG. 4 is a horizontal section taken along line 4—4 of FIG. 2 to illustrate an upper differential gear system.

The upper differential gear system 27 includes a horizontally disposed ring gear 30. Carried by the ring gear 30 is a plurality of equally spaced, radially disposed shafts 31 (FIGS. 2 and 4). Supported by each shaft 31 for individual free rotation about the horizontal axis thereof is a radially disposed bevel gear 32. The bevel gears 32 continuously mesh with a horizontally disposed ring gear 33 and rotate with the ring gear 30 about a vertical axis common to the ring gears 30 and 33. When a suitable reactive load is applied to the bevel gears 32, the bevel gears 32 impart a rotary movement to the ring gear 33. The ring gear 33 is fixedly secured to or integrally formed with a vertically disposed, tubular rotor shaft 34 (FIG. 2) for imparting rotation thereto. Attached to the rotor shaft 34 for rotation therewith is the rotor 18 (FIG. 1). Between the inner wall of the ring gear 30 and the outer wall of the shaft 34 are disposed suitable bearings 34a (FIG. 2).

Figure 5:
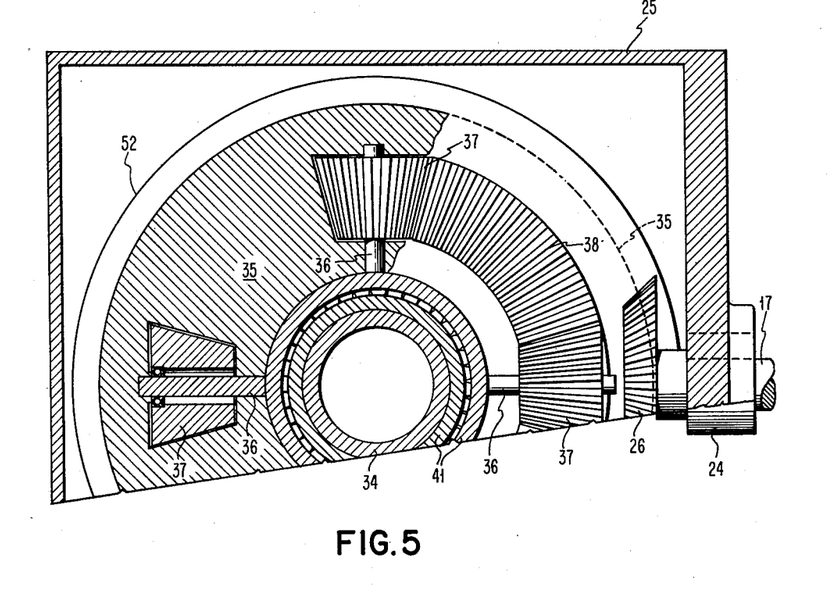
FIG. 5 is a horizontal section taken along line 5—5 of FIG. 2 to show a lower differential gear system.

The lower differential gear system 28 (FIG. 2) comprises a horizontally disposed ring gear 35, which is spaced below and coaxially with the ring gear 30. The vertically disposed bevel gear 26 rotates the ring gears 30 and 35 in opposite directions. Carried by the ring gear 35 is a plurality of equally spaced, radially disposed shafts 36 (FIGS. 2 and 5). Supported by each shaft 36 for individual free rotation about the horizontal axis thereof is a radially disposed bevel gear 37. The bevel gears 37 continuously mesh with a horizontally disposed ring gear 38 and rotate with the ring gear 35 about a vertical axis common to the ring gears 35 and 38.

Spaced between the ring gear 38 and the ring gear 33 are bearings 40. When a suitable reactive load is applied to the bevel gears 37, the bevel gears 37 impart a rotary movement to the ring gear 38. The ring gear 38 is fixedly secured to or integrally formed with a vertically disposed tubular rotor shaft 39 (FIG. 2) for imparting rotation thereto. Fixed to the shaft 39 for rotation therewith is the rotor 19 (FIG. 1). The rotor shafts 34 and 39 are coaxial (FIG. 2). Disposed between the ring gear 35 and the rotor shaft 34 are bearings 41.

For applying the reactive load to the bevel gears 32 of the upper differential gear system 27, a horizontal ring gear 45 (FIG. 2) is disposed in meshing engagement with the bevel gears 32. The ring gear 45 is coaxial with the ring gear 30 and is spaced thereabove. Between the inner wall of the ring gear 45 and the outer wall of the rotor shaft 34 are bearings 46. For applying the reactive load to the bevel gear 37 of the lower differential gear system 28, a horizontal ring gear 47 (FIG. 2) is disposed in meshing engagement with the bevel gears 37. The ring gear 47 is coaxial with the ring gear 35 and is spaced therebelow.

Figure 6:
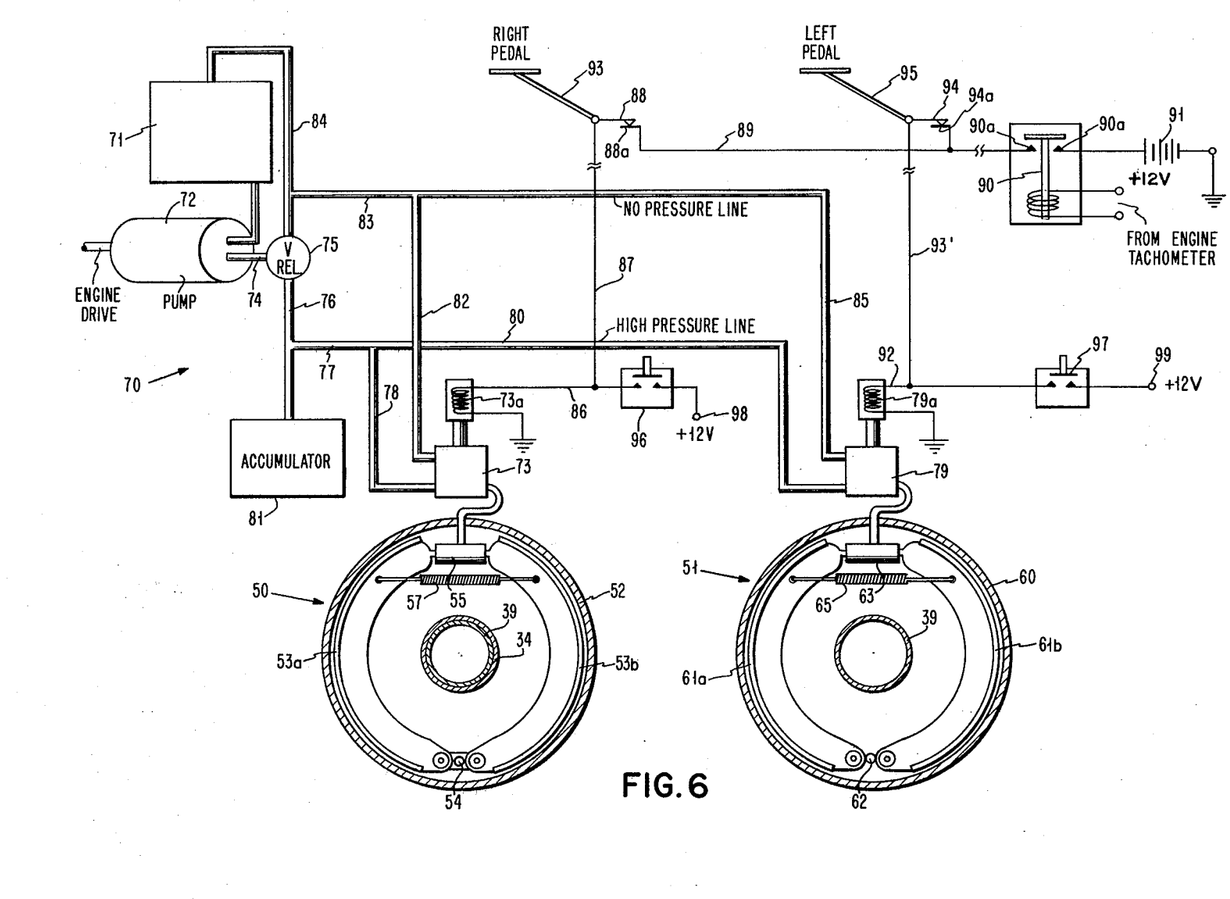
FIG. 6 is a schematic diagram of a hydraulic system shown in conjunction with an upper and lower brake assembly.

Controlling the rotation of the ring gear 45 and the reactive load transmitted therethrough is an upper brake assembly 50 (FIGS. 2 and 6) and controlling the rotation of the ring gear 47 and the reactive load transmitted therethrough is a lower brake assembly 51 (FIGS. 2 and 6). Thus, the differential transmission 15 comprises the upper differential gear system 27 for rotating the rotor 18 and the lower differential gear system 28 for rotating the rotor 19. The operation of the upper differential gear system 27 is controlled by the upper brake assembly 50 and the lower differential gear transmission system 28 is controlled by the lower brake assembly 51.

The brake assembly 50 includes a rotatable, cylindrical brake drum 52 that is fixed to the ring 45 (FIG. 2). As shown in FIGS. 2 and 6, the axis of rotation of the brake drum 52 is coaxial with the rotor shafts 34, 39 and the ring gears 45, 30 and 33. Disposed concentrically with the brake drum 52 and radially inward therefrom are arcuate brake shoes or bands 53a and 53b. Adjacent and facing ends of the brake bands 53a and 53b are pivotally attached to an annular wall 54 of the stationary housing 25. Hence, the brake bands 53a and 53b are not rotatable.

Attached to the opposite end of the brake bands 53a and 53b is a piston of a hydraulic cylinder 55. The cylindrical housing of the cylinder 55 is stationary. Interconnecting the brake bands 53a and 53b is a spring 57. The operation of the hydraulic cylinder 55 controls the engagement and disengagement of the brake bands 53a and 53b with the brake drum 52.

The brake assembly 51 includes a rotatable, cylindrical brake drum 60 that is fixed to the ring gear 47 (FIG. 2). As shown in FIGS. 2 and 6, the axis of rotation of the brake drum 60 is coaxial with the rotor shafts 34, 39 and the ring gears 47, 35 and 38. Disposed concentrically with the brake drum 60 and radially inward therefrom are arcuate brake shoes or bands 61a and 61b. Adjacent and facing ends of the brake bands 61a and 61b are pivotally attached to an annular wall 62 of the stationary housing 25. Hence, the brake bands 61a and 61b are not rotatable.

Attached to the opposite end of the brake bands 61a and 61b is a piston of a hydraulic cylinder 63. The cylindrical housing of the cylinder 63 is stationary. Interconnecting the brake bands 61a and 61b is a spring 65. The operation of the hydraulic cylinders 63 controls the engagement and disengagement of the brake bands 61a and 61b with the brake drum 60.

A hydraulic system 70 (FIG. 6) controls the operation of the hydraulic cylinders 55 and 63 of the brake assemblies 50 and 51, respectively, which comprises a suitable supply of oil or oil reservoir 71. Oil is drawn from the reservoir 71 by a conventional pump 72 of the main drive engine 13 that is operated by means of the drive shaft 17 through a conventional belt and pulley arrangement, not shown.

Oil under relatively high pressure flows from the pump 72 to one side of a solenoid operated control valve 73 over the following path: pump 72, conductor 74, relief valve 75, conductor 76, conductor 77, conductor 78 and control valve 73. From the conductor 77 oil under pressure flows to one side of a solenoid operated control valve 79 through a conductor 80. A suitable accumulator 81 is in communication with the conductors 76 and 77.

The other side of the control valve 73 communicates with the reservoir 71 over the following return path: conductor 82, conductor 83 and conductor 84. The just-mentioned return path is a relatively low pressure line. In a like manner, the other side of the control valve 79 communicates with the reservoir 71 over the following return path: conductor 85, conductor 83 and conductor 84.

Included in the control valve 73 is a solenoid 73a. When the solenoid 73a is energized, oil under high pressure flows from the control valve 73 through the brake cylinder 55 of the upper brake assembly 50 and when the solenoid 73a is deenergized, the control valve 73 shuts off the flow of oil under high pressure into the brake cylinder 55 of the upper brake assembly 50. The energizing circuit for the solenoid 73a is as follows: ground, solenoid 73a, conductor 86, conductor 87, normally closed contacts 88a of directional control switch 88, conductor 89, normally open contacts 90a of relay 90, battery 91 and ground.

Similarly, the control valve 79 includes a solenoid 79a, which controls the operation thereof. When the solenoid 79a is energized, oil under high pressure flows from the control valve 79 through the brake cylinder 63 of the lower brake assembly 51 and when the solenoid 79a is deenergized, the control valve 79 shuts off the flow of oil under high pressure into the brake cylinder 63. The energizing circuit for the solenoid 79a is as follows: ground, solenoid 79a, conductor 92, conductor 93', contacts 94a of directional control switch 94, contacts 90a of relay 90, battery 91 and ground.

The energization of the relay 90 is controlled by a conventional tachometer, not shown, which is driven by the drive shaft 17 of the engine 13. When the engine drive shaft 17 rotates in excess of a predetermined r.p.m., such as 2000 r.p.m., the tachometer produces a sufficient voltage to cause a current flow through the coil of the relay 90 to energize the same. When the engine drive shaft 17 rotates below the predetermined value, insufficient voltage is produced by the tachometer to create a sufficient current flow for energizing the coil of the relay 90. During the time the relay 90 is energized, the normally opened contacts 90a are closed.

When the engine 13 is operating, the pump 72 draws oil from the reservoir 71 and pumps oil under high pressure to the control valves 73 and 79. When the drive shaft 17 of the main engine 13 is in excess of the predetermined speed, the engine tachometer, not shown, produces a sufficient current flow to energize the relay 90, which in turn completes the energizing circuits for the solenoids 73a and 79a. As a consequence thereof, oil under high pressure flows from the control valves 73 and 79 into the brake cylinders 55 and 63, respectively.

The flow of oil under high pressure into the brake cylinder 55 causes the piston thereof to be moved outwardly to cause the brake bands 53a and 53b to engage the brake drum 52. As a result thereof, a reactive force is transmitted through the ring gear 45. This action causes the bevel gears 32 to effect rotation of the ring gear 33, which rotates the rotor shaft 34 to drive the rotors 18 (FIG. 1).

Likewise, the flow of oil under high pressure into the brake cylinder 63 causes the piston thereof to be moved outwardly to cause the brake bands 61a and 61b to engage the brake drum 60. As a result thereof, a reactive force is transmitted through the ring gear 47. This action causes the bevel gears 37 to effect rotation of the ring gear 38, which rotates the rotor shaft 39 to drive the rotors 19 (FIG. 1).

In case of engine failure, the rotation of the drive shaft 17 is less than the predetermined speed and the relay 90 is deenergized. Contacts 90a open to deenergize the solenoids 73a and 79a. As a consequence thereof, the control valves 73 and 79 shut off the flow of oil under high pressure to the brake cylinders 55 and 63, respectively, and connect the brake cylinders 55 and 63 to the low pressure line or return line to the oil reservoir 70. Hence, the pistons of the brake cylinders 55 and 63 are retracted therein. Therefore, the brake bands 53a and 53b disengage the brake drum 52 under the urgency of the spring 57 and the brake bands 61a and 61b disengage the brake drum 60 under the urgency of the spring 65. The brake drums 52 and 60 and the ring gears 45 and 47 are free to rotate. Consequently no reactive force is transmitted to the bevel gears 32 and the bevel gears 38 through the ring gears 45 and 47. Since there is no reaction for rotating the ring gears 33 and 38, the rotors 18 and 19 are not positively driven. Stated otherwise, when the engine 13 fails, the differential gear system 15 is automatically disengaged from the rotor drive for the rotors 18 and 19.

Directional control over the flight of the helicopter 10 may be exercised by an operator actuating the pedals 93 and 95 (FIG. 6). When the pedal 93 is actuated by an operator, the contacts 88a of the directional control switch 88 open to deenergize the solenoid 73a. The deenergization of the solenoid 73a causes the control valve 73 to shut off the flow of oil under high pressure to the brake cylinder 55 and connects the brake cylinder 55 to the low pressure return line to the oil reservoir 71.

Hence, the actuation of the pedal 93, while the engine 13 is operating, effects the shut off of oil under high pressure to the brake cylinder 55 to bring about the retraction of the piston thereof. As a result thereof, the brake bands 53a and 53b are disengaged from the brake drum 52 under the urgency of the spring 57. Consequently, the brake drum 52 and the ring gear 45 are free to rotate and do not impose a reactive force on the bevel gears 32. There is no reaction present to cause the rotation of the ring gear 33 and the rotor shaft 34 has no rotary movement imparted thereto.

When the pedal 93 is released, the contacts 88a of the directional control switch 88 close and the solenoid 73a is energized over a previously described path. Once again oil under high pressure flows through the control valve 73 into the brake cylinder 55. The piston of the brake cylinder 55 is moved outwardly therefrom to cause the brake bands 53a and 53b to engage the brake drum 52. As a result thereof, the brake drum 52 and the ring gear 45 are restrained from rotating and a reactive force is created, whereby the bevel gears 32 once again effect rotation of the ring gear 33, which again rotates the rotor shaft 34 to drive the rotor 18.

By actuating the pedal 95, the contacts 94a of the directional control switch 94 are opened to deenergize the solenoid 79a. The deenergization of the solenoid 79a causes the control valve 79 to shut off the flow of oil under pressure to the brake cylinder 63 and connects the brake cylinder 63 to the low pressure return line to the oil reservoir 71.

Hence, the actuation of the pedal 95, while the engine 13 is operating, effects the shut off of oil under high pressure to the brake cylinder 63 to bring about the retraction of the piston thereof. As a result thereof, the brake bands 61a and 61b are disengaged from the brake drum 60 under the urgency of the spring 65. Consequently, the brake drum 60 and the ring gear 47 are free to rotate and do not impose a reactive force on the bevel gear 37. There is no reaction present to cause the rotation of the ring gear 38 and the rotor shaft 39 has no rotary movement imparted thereto.

When the pedal 95 is released, the contacts 94a of the directional control switch 94 close and the solenoid 79a is energized over a previously described path. Once again oil under pressure flows through the control valve 79 into the brake cylinder 63. The piston of the brake cylinder 63 is moved outwardly therefrom to cause the brake bands 61a and 61b to engage the brake drum 60. As a result thereof, the brake drum 60 and the ring gear 47 are restrained from rotation and a reactive force is created, whereby the bevel gears 37 once again effect rotation of the ring gear 38, which again rotates the rotor shaft 39 to drive the rotor 19.

After the helicopter 10 is on the ground and the engine 13 has been shut off, it is desirable to brake the rotation of the rotors 18 and 19. For this purpose, a manually operated, normally opened switch 96 is connected in series with the solenoid 73a of the control valve 73 and a manually operated, normally opened switch 97 is connected in series with the solenoid 79a of the control valve 79. In series with the switches 96 and 97, respectively, are suitable batteries 98 and 99.

The energization of the solenoids 73a and 79a causes the control valves 73 and 79, respectively, to direct the flow of oil under high pressure from the accumulator 81 into the brake cylinders 55 and 63, respectively. This action causes engagement of the brake bands 53a, 53b and 61a, 61b with the brake drums 52 and 60, respectively, which produces a reactive force in a manner previously described. As a result thereof, the rotation of the ring gears 33 and 38 is gradually stopped by the reverse rotation of the engine drive shaft 17 to brake the rotation of the rotors 18 and 19, after the helicopter 10 has been landed and the engine 13 has been shut off.

In the operation of the transmission 15, the engine 13 rotates the engine drive shaft 17 in a clockwise direction as viewed in FIG. 2. Thereupon, the shaft 17 rotates the bevel gear 26 in a clockwise direction as viewed in FIG. 2. The rotation of the bevel gear 26 effects clockwise rotation of the ring gear 35 (as viewed in FIG. 2) of the lower differential gear system 28 and counterclockwise rotation of the ring gear 30 (as viewed in FIG. 2) of the upper differential gear system 27. The rotation of the ring gear 30 imparts rotation to the bevel gears 32 about the vertical axis of the ring gear 30 in the counterclockwise direction and about the axes of the associated shafts 31. In a like manner, the rotation of the ring gear 35 imparts rotation to the bevel gears 37 about the vertical axis of the ring gear 35 in the counterclockwise direction and about the axes of the associated shafts 36.

If no reactive force is imparted to the bevel gears 32, the bevel gears 32 do not impart any rotary movement to the ring gear 33. Similarly, if no reactive force is imparted to the bevel gears 37, the bevel gears 37 do not impart any rotary movement to the ring gear 38.

When the engine 13 is operating and the pedal 93 is released, the oil under high pressure flowing through the cylinders 55 and 56 causes the pistons thereof to effect the engagement of the brake bands 53a and 53b with the brake drum 52. As a consequence thereof, the brake drum 52 and the ring gear 45 are restrained from rotating. Hence, a reactive force is applied to the bevel gears 32. This action results in the rotation of the ring gear 33 in the clockwise direction. By rotating the ring gear 33 in the clockwise direction, the rotor shaft 34 rotates in the clockwise direction to rotate the rotor 18.

When the engine 13 is operating and the pedal 95 is released, the oil under high pressure flowing through the cylinder 63 causes the pistons thereof to effect the engagement of the brake bands 61a and 61b with the brake drum 60. As a consequence thereof, the brake drum 60 and the ring gear 47 are restrained from rotating. Hence, a reactive force is applied to the bevel gears 37. This action results in the rotation of the ring gear 38 in the counterclockwise direction. By rotating the ring gear 38 in the counterclockwise direction, the rotor shaft 39 rotates in the counterclockwise direction to rotate the rotor 19.

There is present when both brake assemblies 50 and 51 are engaged a two to one ratio between the ring gears 30 and 33, and also a two to one ratio between the ring gears 35 and 38. Because of the interaction between the ring gears 45 and 33 and between the ring gears 35 and 38, the torque developed between the air frame and the rotor 18 is counterbalanced by the reaction of the rotor 19, which permits the helicopter 10 to hover or fly in a straight course.

An operator can control the direction of flight by varying the relative r.p.m. between the rotors 18 and 19. This is accomplished by actuating either the pedal 93 or the pedal 95. When the pedal 93 is actuated, the pressure of the oil flowing through the cylinder 55 is reduced and the piston of the cylinder 55 is retracted. Thus, the brake bands 53a and 53b disengage the brake drum 52 under the urgency of the spring 57. Accordingly, the brake drum 52 and the ring gear 45 are free to rotate. Since there is no reactive force applied to the bevel gears 32, there is no reaction to effect the rotation of the ring gear 33. Hence, no rotation is imparted to the rotor shaft 34 to drive the rotor 18. Under these conditions the rotor 18 is not being driven, while the rotor 19 is being driven. When the operator releases the pedal 93, the pressure of the oil flowing through the cylinder 55 is again increased and the rotor 18 will be driven in a manner previously described.

To further change the direction of travel of the helicopter 10, the pedal 95 may be actuated. By actuating the pedal 95 the pressure of the oil flowing through the cylinder 63 is reduced and the piston of the cylinder 63 is retracted. Thus, the brake bands 61a and 61b disengage the brake drum 60 under the urgency of the spring 65. Accordingly, the brake drum 60 and the ring gear 47 are free to rotate. Since there is no reactive force applied to the bevel gears 37, there is no reaction to effect the rotation of the ring gear 38. Hence, no rotation is imparted to the rotor shaft 39 to drive the rotor 19. Under these circumstances, the rotor 19 is not being driven, while the rotor 18 is being driven. When the operator releases the pedal 95, the pressure of the oil flowing through the cylinder 63 is again increased and the rotor 19 will be driven in a manner previously described.

If the engine 13 fails, the high pressure oil flow is cut off from the cylinders 55 and 63. As a consequence thereof, the brake bands 53a and 53b disengage the brake drum 52 and the brake bands 61a and 61b disengage the brake drum 60. Thus, the brake drum 52 and the ring gear 45 are free to rotate. Likewise, the brake drum 60 and the ring gear 47 are free to rotate. Hence, the bevel gears 32 and 37 do not impart rotation to the ring gears 33 and 38, respectively. Thus, there is no engine drag present. Under these conditions, control over the flight is exercised by conventional rotor controls, not shown, for the rotors 18 and 19.

From the foregoing, it is to be observed that the engine gear transmission is automatically disengaged from the rotors 18 and 19 in the case of engine failure when airborne. In addition, the engine 13 can be operated when the helicopter 10 is on the ground without moving the rotors 18 and 19 and without employing a clutch coupling.

Figures 3, 7:
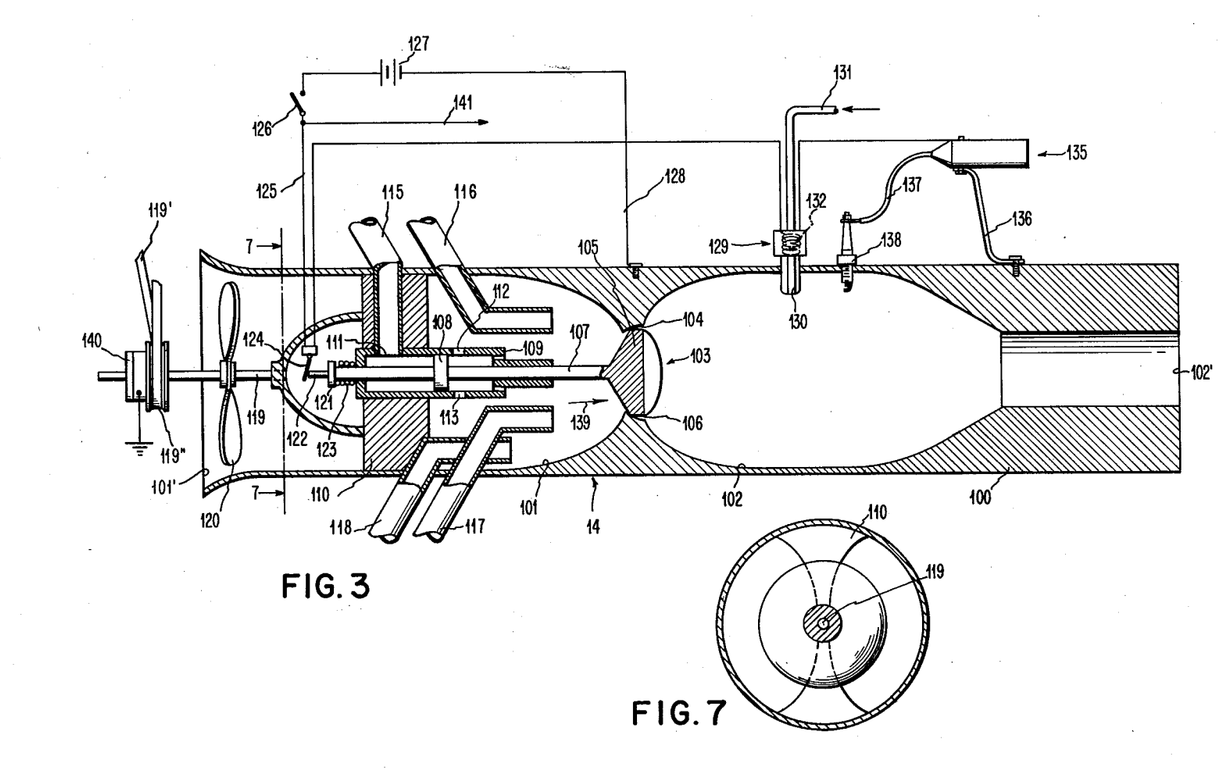
FIG. 3 is an enlarged horizontal sectional view taken along line 3—3 of FIG. 1 to illustrate the auxiliary reaction engine of the present invention and to show schematically therewith an electrical system for fuel injection and for igniting the fuel mixture.
FIG. 7 is a vertical section taken along line 7—7 of FIG. 3.

In FIGS. 1 and 3 is shown the auxiliary reaction engine 14 of the present invention which serves to increase the forward thrust of the helicopter 10. The reaction engine 14 comprises a housing 100. Formed in the housing 100 is a cylindrical intake chamber 101 and a cylindrical combustion and ejection chamber 102. Interposed between the chambers 101 and 102 is a sodium filled main valve 103. An air inlet opening 101' is formed in the housing 100 in communication with the intake chamber 101 and an outlet opening 102' is formed in the housing 100 in communication with the chamber 102. The valve 103 comprises a valve head 106 with a frusto-conically shaped wall 104 which is adapted for engagement with a tapered wall 105 of the housing 100, whereby the engagement of the wall 104 of the valve 103 with the wall 105 of the housing 100 closes the passageway between the chambers 101 and 102 and the removal of the wall 103 from engagement with the wall 105 opens the passageway between the chambers 101 and 102.

Attached to the valve head 106 is a horizontal piston rod 107 and fixed to the rod 107 is a piston 108. The piston 108 is movable within a cylinder 109 that is supported within the chamber 101 by a hub 110. Formed in the cylinder 109 is an intake port 111 and outlet ports 112 and 113. The ports 112 and 113 communicate with the chamber 101. Communicating with the port 111 is an engine exhaust conduit or manifold 115 that forms a passageway for exhaust gases from one cylinder of the engine 13 to the cylinder 109.

Communicating with the chamber 101 of the housing 100 and the engine 13 are engine exhaust conduits or manifold 116—118. Attached to the hub 110 by a shaft 119 is a fan 120. The shaft 119 is driven by the main engine 13 through a V-belt 119' that is trained around a pulley 119". The pulley 119" is mounted on the shaft 119. Exhaust gases produced by the engine 13 flow from the engine 13 into the chamber 101 by way of the manifold 116—118. Air flows through the intake opening 101' and through suitable openings in the hub 110 into the intake chamber 101.

The distal end of the piston rod 107 projects out of the cylinder 109 and has attached thereto by a collar 121 a switch actuating member 122. Disposed between the collar 121 and the cylinder 109 and encompassing the piston rod 107 is a spring 123, which serves to urge the piston rod 107 to move in a direction to close the main valve 103.

Mounted on the housing 100 in contact with the actuating member 122 is an electrical switch 124. While the valve 103 is closed, the actuating member 122 engages the switch 124 to maintain the same in the open position. When the valve 103 is opened, the actuating member 122 actuates the switch 124 to close the same.

Connected to one end of the switch 124 by way of a conductor 125 is an ignition switch 126. Connected in series with the ignition switch 126 is a battery 127. The battery is grounded to the housing 100 by means of a conductor 128. The other end of the switch 124 is connected to a conventional fuel injection unit 129, which includes a fuel ejecting nozzle 130 mounted on the housing 100 in communication with the chamber 102 and a fuel pipe 131 connected to a suitable fuel supply and a coil 132 that controls the flow of fuel through the nozzle 130.

In series with the fuel injection unit 129 is a conventional ignition coil 135, which has one end thereof grounded to the housing 100 over a conductor 136. The ignition coil 135 creates a high electromotive force and through a cable 137 discharges the electromotive force induced therein through a spark plug 138 that is mounted on the housing 100. The spark plug 138 produces an electric spark within the chamber 102. When the switch 126 is closed, a magnetic clutch 140 (FIG. 3) is energized over a path including a conductor 141 to engage the pulley 119" for driving the shaft 119. The rotation of the shaft 119 and the fan 120 therewith functions as a one stage compressor driven by the main engine 13 to conduct air into the intake chamber 101.

In the operation of the auxiliary reaction engine 14, the ignition switch 126 is closed. At the time the switch 126 is closed, the magnetic clutch 140 is energized to engage the pulley 119" with the shaft 119. The fan 120 is thereby operated and air is conducted into the chamber 101. The cycle commences with the valve 103 opening. The valve head 106 is moved in the direction of an arrow 139 against the urgency of the spring 123 (FIG. 3) by the piston 108, which is driven by engine exhaust gases flowing through the conduit 115 during the explosion cycle of one particular cylinder of the main engine 13. Thus, the wall 104 of the valve 103 is removed from engagement with the wall 105 of the housing. When this occurs, hot exhaust gases from the engine 13 mixed with air flow into the chamber 102.

The movement of the valve 103 into the open position causes the actuating member 122 to close the switch 124. The closing of the switch 124 energizes the fuel injection unit 129 and fuel is injected into the chamber 102. Simultaneously, the ignition coil 135 is energized. The fuel injection coil 129 and the ignition coil 135 are energized over the following path: ground, conductor 128, battery 127, switch 126, conductor 125, switch 124, fuel injection coil 132, ignition coil 135, conductor 136 and ground.

During this period of the cycle, fuel, air and exhaust gas form a gas mixture in the chamber 102. After the explosion cycle is completed for one particular cylinder of the main engine, the piston rod 107 is moved in a direction opposite to the direction of the arrow 139 under the resilient action of the spring 123, which causes the valve head 106 to once again engage the wall 104. When the wall 104 of the valve head 106 engages the wall 105 of the housing 100, the valve 103 is closed. The movement of the piston rod 107 in the direction opposite to the arrow 139 also causes the actuating member 122 to open the switch 124. Accordingly, the fuel injection coil 132 is deenergized to stop the flow of fuel into the chamber 102 and the ignition coil 135 is disconnected from its energizing circuit.

At the time the ignition coil 135 is disconnected from its energizing circuit, a back electromotive force is induced therein and a spark is discharged from the spark plug 138 to ignite and explode the mixture of fuel, exhaust gas and air in the chamber 102. The exploded mixture escapes through the outlet 102 to increase the forward thrust of the helicopter 10. This action is in the nature of a periodic jet and a tail-pipe firing. When the particular cylinder of the engine 13 begins its explosion cycle, the above cycle for the auxiliary reaction engine 14 is repeated.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear systems for transmitting driving power thereto, and means responsive to the operation of said engine for controlling the optional driving engagement between said differential gear systems and said rotors while said differential gear systems are in operation.

2. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear transmission systems for transmitting driving power thereto, a first brake assembly connected to said first differential gear system for controlling the driving engagement between said first differential gear system and said first rotor, a second brake assembly connected to said second differential gear system for controlling the driving engagement between said second differential gear system and said second rotor, and means responsive to the operation of said engine for controlling the operation of said first and second brake assemblies to control the driving engagement between said differential gear systems and said rotors while said differential gear systems are in operation.

3. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, a bevel gear disposed in meshing engagement with said first and second differential gear systems, a drive shaft supporting said bevel gear for rotation therewith, an engine coupled to said drive shaft for rotating said drive shaft, and means responsive to the operation of said engine for controlling the optional driving engagement between said differential gear systems and said rotors while said differential gear systems are in operation.

4. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, a bevel gear disposed in meshing engagement with said first and second differential gear systems, a drive shaft supporting said bevel gear for rotation therewith, an engine coupled to said drive shaft for rotating said drive shaft, a first brake assembly connected to said first differential gear system for controlling the driving engagement between said first differential gear system and said first rotor, a second brake assembly connected to said second differential gear system for controlling the driving engagement between said second differential gear system and said second rotor, and means responsive to the operation of said engine for controlling the operation of said first and second brake assemblies to control the driving engagement between said differential gear systems and said rotors while said differential gear systems are in operation.

5. A helicopter comprising an engine, a drive shaft coupled to said engine to be driven by said engine, a bevel gear fixed to said drive shaft for rotation therewith, a first ring gear disposed in meshing engagement with said bevel gear, a second ring gear disposed in meshing engagement with said bevel gear, a plurality of radially disposed first shafts carried by said first ring gear, a plurality of radially disposed second shafts carried by said second ring gear, a first radially disposed gear for each of said first shafts, each of said first radial gears being supported by its associated first shaft for free rotation about the axis thereof and for rotation about the axis of said first ring gear, a second radially disposed gear for each of said second shafts, each of said second radial gears being supported by its associated second shaft for free rotation about the axis thereof and for rotation about the axis of said second ring gear, a third ring gear disposed in meshing engagement with said first radial gears, a fourth ring gear disposed in meshing engagement with said second radial gears, a first rotor attached to said third ring gear for rotation therewith, a second rotor attached to said fourth ring gear for rotation therewith, a first brake assembly connected to said third ring for controlling the reactive force applied to said first radial gears, a second brake assembly connected to said fourth ring for controlling the reactive force applied to said second radial gears, and means responsive to the operation of said engine for controlling the engagement and disengagement of said first and second brake assemblies to control the respective driving relation between said first and second radial gears and said third and fourth ring gears while said first and second ring gears are rotating.

6. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear systems for transmitting driving power thereto, and fluid actuated means responsive to the operative speed of said engine for controlling the optional driving engagement between said differential gear systems and said rotors while said differential gear systems are in operation.

7. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear systems for transmitting driving power thereto, fluid actuated means responsive to the operative speed of said engine for controlling the optional driving engagement between said differential gear systems and said rotors, and means operatively connected to said fluid actuated means for selecting the optional driving engagement between said differential gear transmission systems and said rotors to control the flight of said helicopter.

8. A helicopter comprising a first and second coaxial rotor, a first differential gear system connected to said first rotor and operatively controlled for optional driving engagement with said first rotor while said first differential gear system is in operation, a second differential gear system connected to said second rotor operatively controlled for optional driving engagement with said second rotor while said second differential gear system is in operation, an engine connected to said first and second differential gear systems for transmitting driving power thereto, fluid actuated means responsive to the operative speed of said engine for controlling the optional driving engagement between said differential gear systems and said rotors, means operatively connected to said fluid actuated means for selecting the optional driving engagement between said differential gear systems and said rotors to control the flight of said helicopters, and means operatively connected to said fluid actuated means for braking said rotors.

9. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear transmission systems for transmiting driving power thereto, a first brake assembly connected to said first differential gear system for controlling the driving engagement between said first differential gear system and said first rotor, a second brake assembly connected to said second differential gear system for controlling the driving engagement between said second differential gear system and said second rotor, and fluid actuated means responsive to the operative speed of said engine for controlling the engagement and disengagement of said first and second brake assemblies to control the driving engagement between said differential gear transmission systems and said rotors.

10. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear transmission systems for transmitting driving power thereto, a first brake assembly connected to said first differential gear system for controlling the driving engagement between said first differential gear system and said first rotor, a second brake assembly connected to said second differential gear system for controlling the driving engagement between said second differential gear system and said second rotor, fluid actuated means responsive to the operative speed of said engine for controlling the engagement and disengagement of said first and second brake assemblies to control the driving engagement between said differential gear transmission systems and said rotors, and means operatively connected to said fluid actuating means for controlling the engagement and disengagement of said first and second brake assemblies to select the driving engagement between said differential gear transmission systems and said rotors to control the flight of said helicopter.

11. A helicopter comprising a first and second coaxial rotor, a first differential gear system connected to said first rotor and operatively controlled for optional driving engagement with said first rotor while said first differential gear system is in operation, a second differential gear system connected to said second rotor and operatively controlled for optional driving engagement with said second rotor while said second differential gear system is in operation, an engine connected to said first and second differential gear transmission systems for transmitting driving power thereto, a first brake assembly connected to said first differential gear transmission system for controlling the driving engagement between said first differential gear system and said first rotor, a second brake assembly connected to said second differential gear system for controlling the driving engagement between said second differential gear systems and said second rotor, fluid actuated means responsive to the operative speed of said engine for controlling the engagement and disengagement of said first and second brake assemblies to control the driving engagement between said differential gear transmission systems and said rotors, means operatively connected to said fluid actuating means for controlling the engagement and disengagement of said first and second brake assemblies to select the driving engagement between said differential gear transmission systems and said rotors to control the flight of said helicopter, and means operatively connected to said fluid actuated means for braking said rotors.

References Cited in the file of this patent

UNITED STATES PATENTS

| | | |
|---|---|---|
| 2,421,518 | Molloy | June 3, 1947 |
| 2,473,331 | Donley | June 14, 1949 |
| 2,625,228 | Laskowitz | Jan. 13, 1953 |
| 2,667,227 | Laskowitz | Jan. 26, 1954 |
| 2,669,308 | Thomson | Feb. 16, 1954 |
| 2,671,517 | Lofland | Mar. 9, 1954 |
| 2,687,779 | Peterson | Aug. 31, 1954 |
| 2,985,243 | Tyler | May 23, 1961 |
| 2,992,684 | Caddell | July 18, 1961 |

FOREIGN PATENTS

| | | |
|---|---|---|
| 750,718 | France | May 29, 1933 |
| 1,019,568 | Germany | Nov. 14, 1957 |